(12) United States Patent
Nohl et al.

(10) Patent No.: US 11,008,020 B2
(45) Date of Patent: May 18, 2021

(54) METHOD AND DEVICE FOR CONTROLLING A WARNING MODULE

(71) Applicant: KNORR-BREMSE SYSTEME FUER NUTZFAHRZEUGE GMBH, Munich (DE)

(72) Inventors: Andreas Nohl, Gaeufelden (DE); Markus Klein, Pforzheim (DE); Ulrich Guecker, Schwieberdingen (DE); Matyas Krabot, Szigetszentmiklos (HU); Csaba Doczy, Budapest (HU); Gergely Jozsa, Budapest (HU); Tamas Rozsa, Budapest (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 405 days.

(21) Appl. No.: 15/769,679

(22) PCT Filed: Oct. 18, 2016

(86) PCT No.: PCT/EP2016/074981
§ 371 (c)(1),
(2) Date: Apr. 19, 2018

(87) PCT Pub. No.: WO2017/067929
PCT Pub. Date: Apr. 27, 2017

(65) Prior Publication Data
US 2018/0312172 A1 Nov. 1, 2018

(30) Foreign Application Priority Data
Oct. 22, 2015 (DE) .................. 10 2015 117 976.8

(51) Int. Cl.
*B60W 50/16* (2020.01)
*B60W 30/09* (2012.01)
(Continued)

(52) U.S. Cl.
CPC .......... *B60W 50/16* (2013.01); *B60W 10/18* (2013.01); *B60W 30/09* (2013.01);
(Continued)

(58) Field of Classification Search
CPC ..... B60W 2710/182; B60W 2720/106; B60W 2754/30; G01S 17/931
See application file for complete search history.

(56) References Cited

U.S. PATENT DOCUMENTS

2014/0136044 A1* 5/2014 Conrad ................ G01S 13/931
701/23

FOREIGN PATENT DOCUMENTS

| CN | 102837698 A | 12/2012 |
| CN | 103818378 A | 5/2014 |

(Continued)

OTHER PUBLICATIONS

International Search Report dated Jan. 27, 2017 of the corresponding International Application PCT/EP2016/074981 filed Oct. 18, 2016.

*Primary Examiner* — Peter D Nolan
*Assistant Examiner* — Ce Li Li
(74) *Attorney, Agent, or Firm* — Norton Rose Fulbright US LLP; Gerard Messina

(57) ABSTRACT

A method for controlling a warning module based on an expected time period up to a collision of a vehicle with an obstacle, including: permitting an outputting of a generated warning to a driver of the vehicle if the expected time period up to the collision is shorter than a limiting value function, which depends on a speed of the obstacle and/or a relative speed of the vehicle with respect to the obstacle, and otherwise suppressing a warning to the driver; in which the warning module is configured to generate the warning of an imminent triggering of an automatic emergency braking
(Continued)

process of the vehicle to avoid the collision. Also described is a related device and computer readable medium.

19 Claims, 4 Drawing Sheets

(51) Int. Cl.
  *B60W 10/18* (2012.01)
  *B60W 30/095* (2012.01)
  *B60W 50/14* (2020.01)

(52) U.S. Cl.
  CPC .... *B60W 30/0953* (2013.01); *B60W 30/0956* (2013.01); *B60W 50/14* (2013.01); *B60W 2050/143* (2013.01); *B60W 2050/146* (2013.01); *B60W 2520/10* (2013.01); *B60W 2520/105* (2013.01); *B60W 2554/00* (2020.02); *B60W 2554/801* (2020.02); *B60W 2554/804* (2020.02); *B60W 2710/182* (2013.01); *B60W 2720/106* (2013.01); *B60W 2754/30* (2020.02)

(56) References Cited

FOREIGN PATENT DOCUMENTS

| | | | | |
|---|---|---|---|---|
| CN | 102745194 B | * | 2/2015 | |
| DE | 102005012037 A1 | | 9/2006 | |
| DE | 102005013448 A1 | | 9/2006 | |
| DE | 102007060862 A1 | | 7/2009 | |
| DE | 102009012226 A1 | | 9/2010 | |
| DE | 102010049351 A1 | | 4/2012 | |
| DE | 102013222880 A1 | | 5/2014 | |
| DE | 102013008073 A1 | | 11/2014 | |
| DE | 102013218280 A1 | * | 3/2015 | .......... B60W 30/095 |
| DE | 102013218280 A1 | | 3/2015 | |
| EP | 1539523 A1 | | 6/2005 | |

* cited by examiner

METHOD AND DEVICE FOR CONTROLLING A WARNING MODULE

FIELD OF THE INVENTION

The present invention relates to a method and to a device for controlling a warning module and, in particular, to a method for suppressing excessively early warnings by automatic electronic emergency brake systems (AEBS) in dynamic situations.

BACKGROUND INFORMATION

In modern vehicles, more and more assistance systems are being used in order, on the one hand, to increase safety further and, on the other hand, to move towards autonomous driving. A particularly important aspect is here the detection of critical situations and the triggering of a corresponding reaction on the basis thereof. In particular in the case of emergency situations which lead to an accident in the case of incorrect behavior it is important to assist the driving correspondingly. An example of this is the triggering of an emergency braking operation which is intended to avoid or at least alleviate an immediately imminent collision. However, in order to avoid surprising a driver by the automatic triggering of an emergency braking operation, such systems have warning modules which inform a driver of the imminent triggering of an emergency braking operation.

Document EP 1 539 523 B1 discusses a method and a device in which an automatic emergency braking process is triggered after the expiry of a warning time period during which the driver is provided with the possibility of avoiding the automatic emergency braking process by intervention in the form of a driver braking request. The warning time period is divided here chronologically into two stages, wherein in a first period a visual, acoustic or haptic driver warning is output. If the driver does not react thereto, during a second time period partial braking is initiated with partial braking deceleration which is less than a predefined (maximum) emergency braking deceleration. Only if the driver also allows the second warning stage time period to pass without activating at least one operator control element will the emergency braking process be automatically triggered. During the warning time period, the driver therefore has the possibility of averting the hazardous situation, for example by activating the brake.

In this context, the warning time period is permanently predefined or set as a function of the vehicle mass, the coefficient of friction of the wheel brake devices of the vehicle, the condition of the roadway or the visibility conditions. In this conventional method, the determined acceleration of the vehicle and a currently present relative acceleration between the vehicle and the vehicle traveling ahead are also acquired in order to determine the condition which triggers a warning.

The specified document uses the relative acceleration between the vehicles in order to determine the time of the stationary state of the obstacle by using the movement equation. However, if an attempt is made not to follow the approach proposed in document EP 1 539 523 B1 but rather instead to permanently set the warning on the basis of an instantaneous relative movement situation, there is frequently an excessively early warning or a superfluous warning of the driver, which significantly reduces the acceptance of such systems. In particular if the vehicle traveling ahead comes to a standstill and the relative acceleration suddenly drops to a value of zero, incorrect behavior occurs, e.g. if a braking operation (negative acceleration) of the vehicle traveling ahead is extrapolated into the future and it is assumed that the braking operation of the vehicle traveling ahead continues and therefore the distance from the vehicle traveling ahead becomes increasingly small. Under this assumption, the warning would be output to the driver at a correspondingly earlier point. However, if the acceleration (i.e. the braking operation) of the vehicle traveling ahead suddenly drops from a value which is different from zero to a value of zero, the speed of the vehicle traveling ahead does not decrease any further. However, if a further reduction is assumed this causes a warning to be output too early in such situations. In other words, in situations when the vehicle stops or is just about to stop, the warning would only need to be output at a later time.

Therefore, there is a need for a method which avoids uncritical warnings to a driver, in particular just before a stationary state of the obstacle, and which withstands plausibility checking.

SUMMARY OF THE INVENTION

The present invention solves the abovementioned technical problem by a method and a device for controlling a warning module on the basis of an expected time period up to a collision as claimed in claim 1 or claim 10, and a computer program product as claimed in claim 11. The dependent claims relate to further advantageous developments.

The present invention relates to a method for controlling a warning module on the basis of an expected time period up to a collision of a vehicle with an obstacle. The warning module is configured to generate a warning of imminent triggering of an automatic emergency braking process of the vehicle in order to avoid the collision. The method comprises permitting outputting of a generated warning to a driver of the vehicle, (only) if the expected time period up to the collision is shorter than a limiting value function which depends on a speed of the obstacle and/or a relative speed of the vehicle with respect to the obstacle. If this is not the case, a warning to the driver is suppressed. Of course, permitting a warning does not mean that the driver is necessarily warned. Instead, in this case the warning module is not prevented from warning the driver. The timing of a warning is determined by the warning module.

The term "warning" is intended to be interpreted in a broad sense within the scope of the present disclosure and comprises both generating a warning signal and outputting a warning. Correspondingly, the step of suppressing a warning can mean, on the one hand, that the corresponding warning signal is not generated by the warning module or else that only the outputting of the warning signal to the driver is suppressed, with the result that the driver does not obtain any knowledge of any warning. Correspondingly, a warning to a driver is to be understood as meaning such signaling which brings about a potential reaction of a driver.

It must therefore be possible for the warning to be perceived as such by the driver, in whatever form it is present.

Basically, warnings are to be output only when they are justified. Otherwise there is a risk of the driver finding superfluous or uncritical warnings disruptive and attempting to switch off or deactivate the system correspondingly, which runs counter to the purpose of such systems. It is therefore important to warn the driver only when an emergency situation is actually present.

The warning module can be configured, for example, to evaluate periodic sensor data (e.g. from a radar, lidar, camera) which have been acquired (e.g. at least once every 100 ms or every 40 ms) about the surroundings of the vehicle. On the basis thereof, both stationary and moving objects on the roadway can be detected, wherein as a rule driving objects are already detected at a larger distance than ones which are already stationary. In this way, the stopping of a vehicle can already be detected at a large distance, while a stationary object is not detected until it is relatively close. Of course, both situations are equivalent as long as the expected time period up to a potential collision is sufficiently long. In the exemplary embodiments, the various situations are differentiated with respect to their potential risk.

The method therefore comprises, according to further exemplary embodiments, suppressing the warning to the driver if the expected time period up to the collision is above a maximum absolute value. The maximum absolute value can be, for example, a fixedly predefined time period (e.g. 3 seconds, 3.2 seconds, 5 seconds). It is generally selected to be so large that in all cases the driver has sufficient time to react, specifically independently of the specific situation. Accordingly, there is (still) no reason to warn the driver.

In further exemplary embodiments, the limiting value function is given by a fixed value if the obstacle has a constant speed. A constant speed is also to be understood as, in particular, the case in which the speed is equal to zero (i.e. the vehicle is stationary).

In further exemplary embodiments, the limiting value function is a function of a parameter, wherein the parameter defines a ratio of the speed of the obstacle to the relative speed of the vehicle with respect to the obstacle. The fact that the limiting function is a function of the parameter means that a change in the parameter gives rise to a change in the limiting value function. The limiting value function therefore depends in whatever form on the parameter. In further exemplary embodiments, the limiting value function can, of course, depend on yet other parameters which additionally improve the method of functioning of the described method.

In further exemplary embodiments the limiting value function can be represented as a partially non-homogeneous linear function in the parameter, so that if the expected time period up to the collision is shorter than a minimum value a warning is always permitted, and if the expected time period up to the collision is longer than the minimum value the limiting value function increases in proportion with the parameter. The specified linear function merely constitutes an example which can be easily and quickly calculated and handled, with the result that the corresponding calculations can be executed within a very short time, which is important, in particular, for the described emergency situations. However, if corresponding resources are available, it is, of course, also possible for the linear function to constitute a general curve which separates a region where a warning is permitted from a region where a warning is suppressed.

In further exemplary embodiments, the minimum value is given by a first value and a second value (e.g. as a sum), wherein the first value defines a minimum warning time which a driver requires to be able to react to a warning, and the second value defines a correction value which is set in such a way that uncritical warnings which are generated by the warning module are suppressed just before a stationary state of the obstacle.

In further exemplary embodiments, the second value is determined by optimization, with the result that the second value is low enough to suppress the uncritical warnings and high enough to output critical warnings generated by the warning module to the driver, in particular if the speed of the obstacle is above a threshold value.

The optimization described here can be achieved by a simulation in which various traffic situations are played through. On the one hand such traffic situations relate to the case in which the obstacle is not yet moving quickly enough (for example more quickly than 20 km/h or more quickly than 30 km/h or more quickly than 50 km/h), where a directly imminent stationary state is not to be expected. In this case, all the warnings generated by the warning module are to be output to the driver. On the other hand, the simulation also covers the cases in which the vehicle is just before a stationary state, i.e. the vehicle traveling ahead or the obstacle is moving more slowly than a specific speed (e.g. less than 5 km/h or less than 10 km/h), with the result that the stationary state can be expected just before the triggering of the warning or just thereafter. In such a case, uncritical warnings which do not give rise to a collision in the simulation (since e.g. the reaction of the driver is sufficient) are to be filtered out.

The filtering out is carried out by shifting the limiting value function by changing the second value. If this value is lower, more warnings are suppressed, and if this value is higher, more warnings are permitted. In this simulation it is also possible to take into account parameters of the vehicle/obstacle and reactions of the driver, such as e.g. the maximum deceleration of the vehicle or the various reaction possibilities of the driver (e.g. when and to what extent he initiates a braking operation). Further parameters in the simulation are the type of vehicle (e.g. whether it is a utility vehicle or a passenger car), the weight of the vehicle, weather conditions or road conditions.

As is also the case in the conventional systems, in further exemplary embodiments the generated warning can have two successive stages, wherein within a first stage the driver is warned visually, acoustically or haptically, without automatic deceleration of the vehicle being triggered. In a subsequent second stage, automatic deceleration of the vehicle is triggered in turn with a predetermined deceleration. The predetermined deceleration is intended to be, in particular, lower than the maximum deceleration which is triggered in the case of emergency braking. On the other hand, the predetermined deceleration is to be high enough to be detected unambiguously as such by the driver and to already significantly decelerate the vehicle. This value can also depend again on the vehicle itself and on the weight of the vehicle and be adapted to the circumstances.

In further exemplary embodiments, the method also comprises triggering an emergency braking process if the driver does not exhibit any predetermined reaction to the generated warning, wherein the automatic emergency braking operation is for example executed until a predetermined safety distance from the obstacle is reached. The predetermined reaction can comprise a braking process, steering process or flashing light process triggered by the driver, or some other reaction, which makes it possible to infer that the driver is aware of the present emergency situation.

This method can also be implemented or stored in the form of instructions in software or on a computer program product, wherein stored instructions are capable of executing the steps according to the method when the method runs on a processor (e.g. one of the vehicle control units). Therefore, the present invention also relates to a computer program product with software code (software instructions) which is stored thereon and is configured to execute one of the methods described above when the software code is executed by a processing unit. The processing unit can be any form of computer or control unit and can also comprise the described control module or the warning module controller which have a corresponding microprocessor which can execute a software code.

The present invention also relates to a device for controlling a warning module on the basis of an expected time period up to a collision. The warning module is in turn configured to generate a warning of imminent triggering of an automatic emergency braking process of a vehicle in order to avoid a collision with an obstacle. The device comprises a warning module controller which is configured to permit outputting of a generated warning to a driver of the vehicle (only) if the expected time period up to the collision is shorter than a limiting value function. The limiting value function depends on a speed of the obstacle and/or a relative speed of the vehicle with respect to the obstacle. If the expected time period up to the collision is longer than a limiting value function (or the same), outputting of the warning to the driver is suppressed.

The exemplary embodiments of the present invention are understood better from the following detailed description and the appended drawings of the different exemplary embodiments, which, however, should not be understood as meaning that they restrict the disclosure to the specific embodiments but rather serve merely for explaining and improving comprehension.

DETAILED DESCRIPTION

Figure 1:
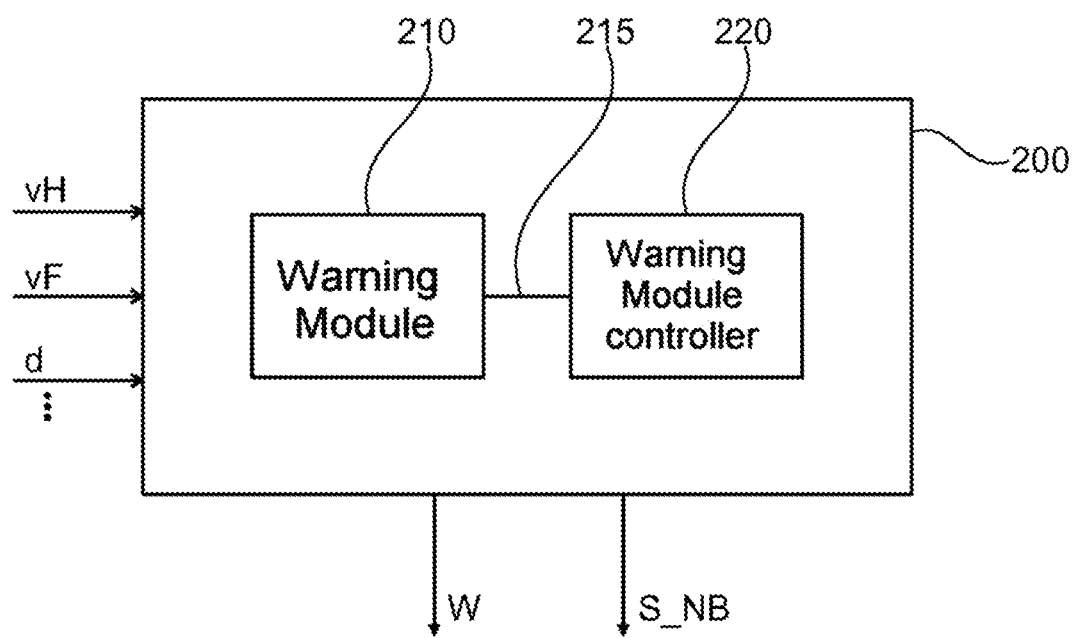
FIG. 1 shows a schematic view of a device for controlling a warning module on the basis of an expected time period up to a collision according to exemplary embodiments of the present invention.

FIG. 1 shows an exemplary embodiment of a device 200 for controlling a warning module 210 on the basis of an expected time period up to a collision according to exemplary embodiments of the present invention. The device 200 outputs, for example, warnings W and a control signal for triggering emergency braking operations S_NB. This information is generated as a function of the input values which can comprise, inter alia, the speed of the obstacle vH, the speed of the vehicle vF, a distance d between the obstacle and the vehicle and further parameters. For example, it is also possible to take into account weather conditions or road conditions or coefficients of friction with respect to the road, since such parameters likewise influence an emergency braking operation which is to be executed.

The warning module 210 is configured to generate the warning W of an imminent triggering of an automatic emergency braking process of the vehicle in order to avoid the collision with the obstacle. The warning module 210 also determines, in particular, the time of the outputting of the warning W. The emergency braking itself is initiated by outputting the control signal S_NB at a later time. The input values which are shown are included as input parameters in the device 200, in order to output a warning W to the driver on the basis thereof at a correct time.

In the exemplary embodiment shown, the warning module 210 is coupled to a warning module controller 220 via a coupling 215. The coupling 215 causes the warning module 210 to suppress the generation of a warning or not to output a generated warning if specific conditions are not met. These conditions include, in particular, the fact that the expected time period up to the collision is shorter than the limiting value function, wherein the limiting value function depends on the speed of the obstacle vH and/or on a relative speed of the vehicle vF. Therefore, the coupling 215 can optionally merely prevent the warning module 210 from not outputting generated warnings if the specified condition is not met.

This also means that the warning module controller 220 does not need to change the method of functioning of the warning module 210 itself—only the outputting of the warning can be controlled as a function of the condition. Accordingly, in further exemplary embodiments the warning module 210 is likewise not part of the device 200 but rather can be present as an external (conventional) component, wherein the warning module controller 220 controlled the output of warnings by the warning module 210 and/or the passing on of warnings to the driver.

Figure 2:
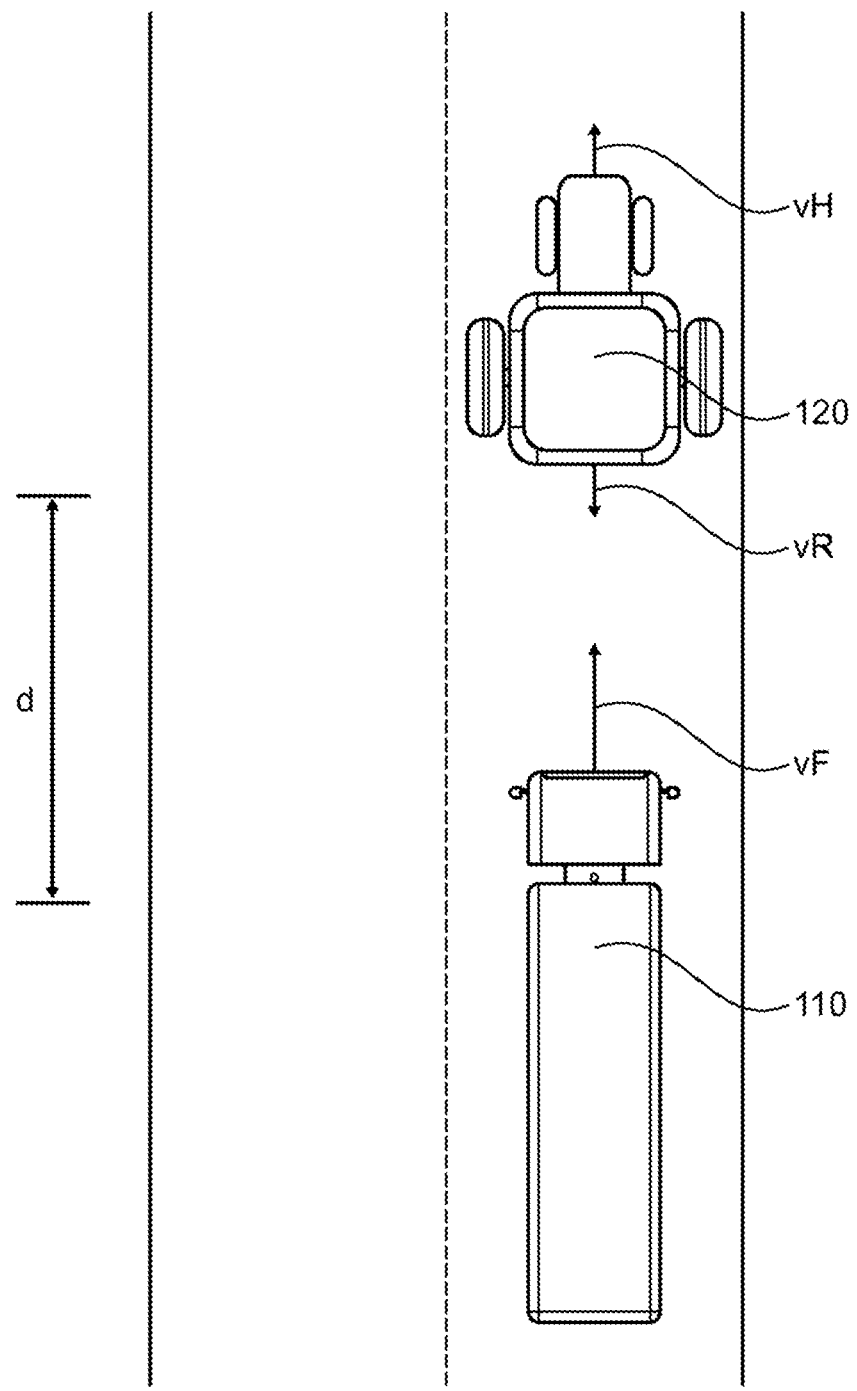
FIG. 2 shows an exemplary traffic situation.

FIG. 2 shows an exemplary traffic situation where an obstacle 120 (e.g. another vehicle) is moving at a speed vH on a road. After the obstacle 120 the vehicle 110 is moving at a speed vF. The speed of the vehicle 110 is higher than the speed of the obstacle (vF>vH) and accordingly there is a negative relative speed vR which causes a distance d between the vehicle 110 and the obstacle 120 to become smaller over time. If the vehicle 110 and the obstacle 120 maintain their speeds vF, vH, there will inevitably be a collision. In order to prevent this, the driver of the vehicle 110 must either initiate a braking process or execute a lane change, in order to pass the obstacle 120 (assuming that the obstacle 120 does not change its movement).

Figure 3:
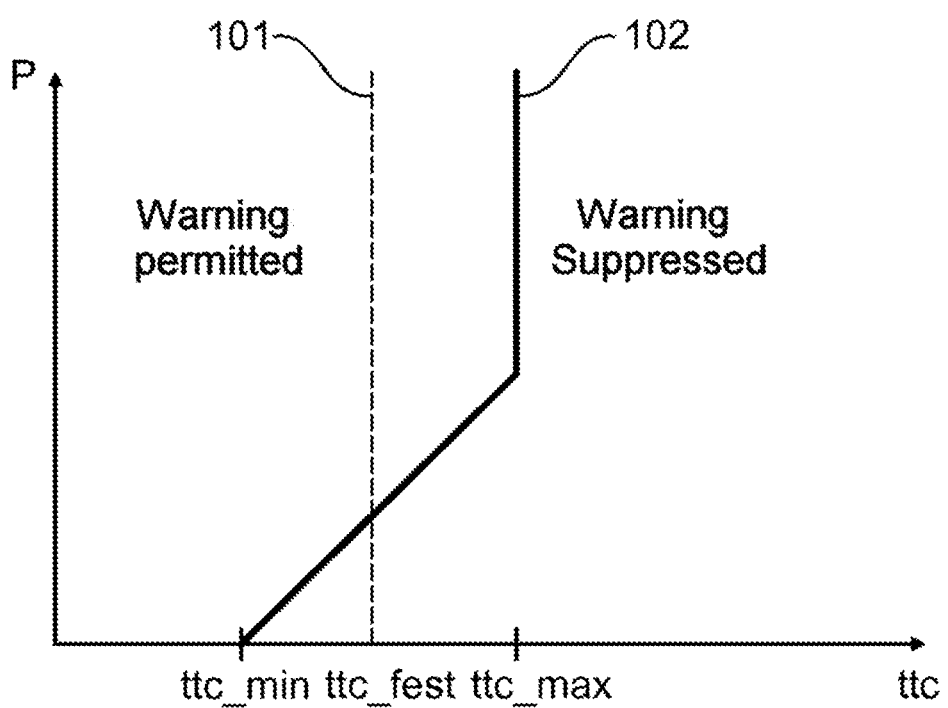
FIG. 3 shows exemplary limiting value functions.

FIG. 3 shows examples of a first and a second limiting value function 101, 102 which can depend on a parameter P and separates as a function of parameter P a region where a warning is suppressed from a region where warnings are permitted. This separation takes place on the basis of an expected time period up to a collision ttc which can be calculated by the warning module 210. As is illustrated in FIG. 3, warnings are permitted, in particular, when the expected time period up to the collision ttc is shorter than the limiting value functions 101, 102. The separating line itself (for ttc=limiting value function 101, 102) can be assigned to one or other of the regions, i.e. for these specific ttc values warnings can be permitted or can be suppressed in other embodiments.

The first limiting value function 101 describes the case in which the obstacle has a constant speed, i.e. is moving free of acceleration (wherein the obstacle can, in particular, also be stationary). In this case, the limiting value function 101 does not depend on the parameter P but is instead defined by a fixed value ttc_fest, i.e. warnings are permitted for ttc<ttc_fest, and warnings are suppressed for ttc>ttc_fest.

The second limiting value function 102 relates to the case in which the obstacle has a non-constant speed (i.e. a braking or accelerating obstacle). In this case, the limiting value function 102 is a function of the parameter P, wherein the warning is basically suppressed for time periods ttc above a maximum value ttc_max and basically permitted below a minimum value ttc_min. The limiting value function 102 can be represented as a curve (a linear curve in the example shown) between the minimum value ttc_min and the maximum value ttc_max, which curve which gives rise to increasing values for the expected time period ttc up to the collision with the obstacle, for increasing the values of the parameter P.

In further exemplary embodiments, the fixed value ttc_fest can correspond to the maximum value ttc_max or to the minimum value ttc_min or can also not correspond (as shown in FIG. 3).

For this case, the limiting value function G can be expressed by the following formula:

$$G = ttc\_min + tFactor * P = tFixedttc + tWarningTimeMin + tFactor * vObst/vRel$$

where in this case the parameter P is given by the ratio between the speed of the obstacle vH and the speed of the vehicle vF, and the minimum value ttc_min comprises two values: tFixedttc and tWarningTimeMin. The value tWarningTimeMin represents a first value for the minimum time which the system must wait in order to provide a driver basically with the possibility of reacting correspondingly to the traffic situation. This value is, for example, in a range from 0.5 . . . 1.5 seconds. However it can be freely selected. Furthermore, the minimum value ttc_min is defined by a second value tFixedttc, wherein the second value represents a correction value which is determined by a simulation. The increase factor tFactor is likewise a further parameter which is adapted to specific situations by simulations.

Within the scope of the simulation for determining the values tFixedttc and tFactor, in particular the following situations are investigated and taken into account:

(a) The obstacle is not just before the stationary state (e.g. the speed of the obstacle vH is higher than a threshold value). In this case, no warnings which are generated by the warning module are to be suppressed and all the simulation results are to lie in the permitted range (to the left of the curve).

(b) The obstacle is just before the stationary state, but the situation is uncritical (e.g. the result of the simulation does not lead to a collision). In this case, generated warnings should be suppressed, with the result that all the simulation results are to lie in the suppressed region (to the right of the curve). These are superfluous warnings.

As result of the simulation, times are therefore determined when the system would output a warning, and these times correspond to points in the diagram in FIG. 3. The limiting value function is then positioned in such a way that for critical situations where the warning is justified the points are correspondingly located in the permitted region, and the warning is to be suppressed for uncritical situations. This takes place specifically in FIG. 3 by shifting the limiting value function 102 in parallel with the ttc axis, specifically by increasing or decreasing the second value tFixedttc, with the result that the uncritical warnings lie in the area below the limiting value function 102 and are therefore suppressed. Incorrect warnings for the driver are therefore avoided.

Figure 4:
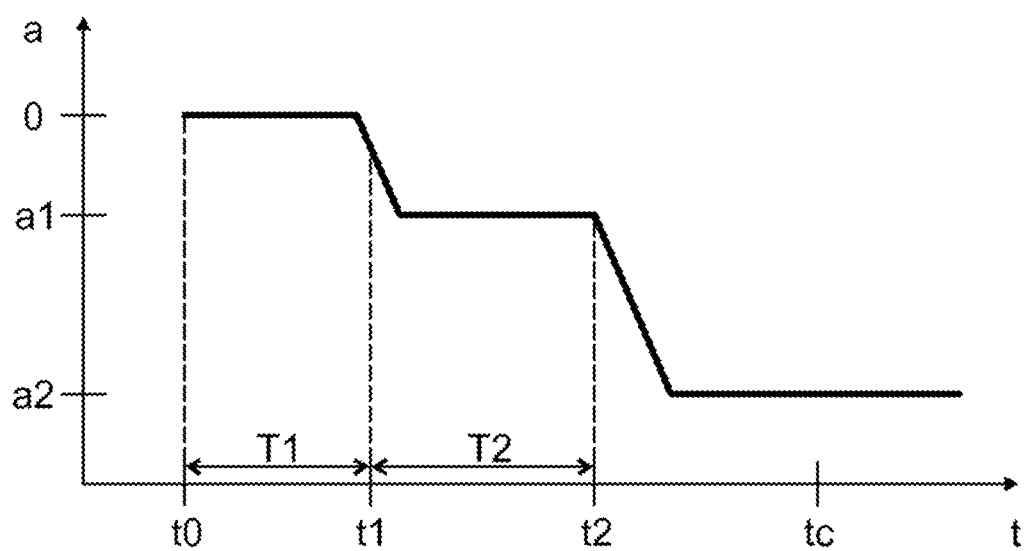
FIG. 4 shows an example of a two-stage warning which the warning module can generate.

FIG. 4 shows an example of a two-stage warning by the acceleration a of the vehicle 110. The vehicle 110 is firstly free of acceleration (a=0) up to a time t0, i.e. it moves at a constant speed vF. At the time t0 the device 200 has output a warning W to the driver.

The warning W comprises in a first stage between the starting time t0 and a first time t1 merely a visual, acoustic or haptic warning signal which the driver can perceive. If the driver does not react to this warning signal, braking of the vehicle 110 with a braking deceleration a1 occurs at the first time t1 after a waiting time T1. This braking deceleration lasts up to a second time t2 over a time period T2. If the driver does not react to this second warning either, or not correspondingly, an emergency braking operation with a second braking deceleration a2 is initiated at the second time t2 (by outputting the signal S_NB). The emergency braking operation can be executed, for example, until the vehicle 110 has reached a minimum distance from the obstacle 120 or has come to a standstill.

The first braking deceleration a1 and the second braking deceleration a2 are freely selectable. The first braking deceleration a1 should, however, be sufficiently long that it is perceived unambiguously by the driver and the driver is informed about an imminent emergency braking operation. However, at the same time, said emergency braking operation should not place the vehicle 110 in a critical situation. The second braking deceleration a2 can be determined, for example, in such a way that the vehicle 110 brakes with a maximum possible deceleration in order to eliminate the hazardous situation.

The waiting time T1 and the time period T2 can be selected such that they are equal or else different from one another. Both time periods should in each case be at least so long that a driver is able to perceive them as a warning time period and correspondingly be able to react to them. For example, the waiting time T1 and the time period T2 can each be selected in a range between 0.7 s . . . 1.5 s.

Essential aspects of the present invention can be summarized as follows:

The present invention solves the technical problem presented at the beginning by virtue of the fact that, on the one hand, for the case in which the obstacle 120 does not perform decelerated movement a fixed threshold value is used (in particular in the case of a constant movement, a stationary state, stopping of the obstacle 120 before the warning is triggered). Furthermore, this fixed threshold value is adapted on the basis of the remaining influence of the relative acceleration, wherein the influence is estimated by the ratio of the speed of the obstacle 120 to the relative speed. The higher the value of this ratio, the longer the braking movement of the obstacle 120 is valid, and the critical situation described above (just before the vehicle 110 comes to a standstill) is not yet reached.

Exemplary embodiments therefore avoid the disadvantage of the alternative procedure and suppress excessively early warnings since a variable limiting value for the time up to the collision is used to filter out excessively early warnings. According to exemplary embodiments, the limiting value is adapted in such a way that uncritical, excessively early warnings are filtered out, while the "conventional" cases (e.g. with a longer time period up to the collision or at relatively high obstacle speeds vH) continue to be taken into account as valid warnings. The reliability of the system is therefore maintained. If a fixed limiting value is taken, the efficiency of the system would be considerably reduced.

According to the present invention, the limiting value G is determined by a linear formula which takes into account a minimum warning time which a driver requires to be able to exhibit any reaction at all. This means that at least this time period must be allowed for the driver so that he can appropriately exhibit any reaction at all. This minimum warning time is also adapted by a correction value (tFixedttc) which can be determined by a simulation. Firstly, for this purpose the largest possible value occurring in the simulations for ttc is assumed for stationary objects which determine this value and should not be influenced by the ttc threshold value. As a next step the largest possible ttc value for moving objects which have come to a standstill before the warning stages had been activated is determined. The fixed value should not influence the behavior of stopped vehicles, specifically up to the maximum speed of the driving vehicle.

Furthermore, the ttc value is determined for a dynamic test case. The fixed value tFixedttc should be small enough to suppress the warning stages until the obstacle 120 stops in these specific situations. Incorrect warnings occur directly before the stationary state of the obstacle 120. Furthermore, the largest possible and valid ttc value for braking obstacles 120 is to be determined in such a way that if an influence of the relative acceleration is still very high, the threshold value should not suppress the warning cascade. The dynamic part of the threshold value should be large enough in these situations. The resulting threshold value would not have any influence on a test case if the warning starts at the earliest possible time. This should ensure the efficiency of the method.

The method can also be implemented by computer. i.e. it can be implemented by instructions which are stored on a storage medium and are capable of executing the steps of the method when it runs on a processor. The instructions typically comprise one or more instructions which can be stored in different ways on different media in or peripheral to a control unit (with a processor), which media, when read and executed by the control unit, cause the control unit to execute functions, functionalities and operations which are necessary for executing a method according to the present invention.

The features of the invention which are disclosed in the description, the claims and the figures can be essential to the implementation of the invention both individually and in any desired combination.

LIST OF REFERENCE SYMBOLS 101,102 Limiting value function/functions
110 Vehicle
120 Obstacle
200 Device for controlling the warning
210 Warning module
220 Warning module controller
W Warning
S_NB Emergency braking signal
vH Speed of the obstacle
vF Speed of the vehicle
a Acceleration of the vehicle
vR Relative speed between the obstacle and the vehicle
d Distance between the obstacle and the vehicle

The invention claimed is:

1. A method for controlling a warning module based on an expected time period up to a collision of a vehicle with an obstacle, the method comprising:
permitting an outputting of a generated warning to a driver of the vehicle if the expected time period up to the collision is shorter than a limiting value function, which depends on a speed of the obstacle and/or a relative speed of the vehicle with respect to the obstacle, and otherwise suppressing a warning to the driver;
wherein the warning module is configured to generate the warning of an imminent triggering of an automatic emergency braking process of the vehicle to avoid the collision,
wherein the limiting value function is a function of a speed parameter,
wherein the limiting value function is representable as a partially non-homogenous linear function in the speed parameter,
wherein a minimum value is given by a first value and a second value, wherein the first value defines a minimum warning time, and the second value defines a correction value,
wherein the second value is determined by optimization, with the result that the second value is low enough to suppress uncritical warnings and high enough to output critical warnings generated by the warning module to the driver, and
wherein if the expected time period up to the collision is shorter than the minimum value the warning is permitted, and wherein if the expected time period is not shorter than the minimum value, the limiting value function increases with the speed parameter.

2. The method of claim 1, further comprising:
suppressing the warning to the driver if the expected time period up to the collision is above a maximum absolute value.

3. The method of claim 1, wherein the limiting value function has a fixed value if the obstacle has a constant speed.

4. The method of claim 1, wherein the speed parameter defines a ratio of the speed of the obstacle to the relative speed with respect to the obstacle.

5. The method of claim 4, wherein if the expected time period up to the collision is shorter than the minimum value a warning is always permitted, and if the expected time period up to the collision is longer than the minimum value the limiting value function increases in proportion with the speed parameter.

6. The method of claim 5, wherein the minimum warning time is a time that a driver requires to react to a warning, and the correction value is set so that the uncritical warnings which are generated by the warning module are suppressed just before a stationary state of the obstacle.

7. The method of claim 6, wherein the second value is low enough to suppress the uncritical warnings and high enough to output critical warnings generated by the warning module to the driver, if the speed of the obstacle is above a threshold value.

8. The method of claim 1, wherein the generated warning includes two successive stages, wherein within a first stage the driver is warned visually, acoustically or haptically, without automatic deceleration of the vehicle being triggered, and in a subsequent second stage automatic deceleration of the vehicle is triggered with a predetermined deceleration.

9. The method of claim 8, further comprising:
triggering of an emergency braking process if the driver does not exhibit any predetermined reaction to the generated warning, wherein the automatic emergency braking process is executed until a predetermined safety distance from the obstacle is reached.

10. A device for controlling a warning module based on an expected time period up to a collision, comprising:
a warning module controller configured to permit outputting of a generated warning to a driver of a vehicle if the expected time period up to the collision is shorter than a limiting value function which depends on a speed of the obstacle and/or a relative speed of the vehicle with respect to the obstacle, and otherwise to suppress outputting of the warning to the driver;
wherein the warning module is configured to generate the warning of an imminent triggering of an automatic emergency braking process of the vehicle to avoid a collision with an obstacle, wherein the limiting value function is a function of a speed parameter, wherein the limiting value function is representable as a partially non-homogenous linear function in the speed parameter, wherein a minimum value is given by a first value and a second value, wherein the first value defines a minimum warning time, and the second value defines a correction value, and wherein the second value is determined by optimization, with the result that the second value is low enough to suppress uncritical warnings and high enough to output critical warnings generated by the warning module to the driver, and wherein if the expected time period up to the collision is shorter than the minimum value the warning is permitted, and wherein if the expected time period is not shorter than the minimum value, the limiting value function increases with the speed parameter.

11. The device of claim 10, wherein the speed parameter defines a ratio of the speed of the obstacle to the relative speed with respect to the obstacle.

12. The device of claim 11, wherein if the expected time period up to the collision is shorter than the minimum value a warning is always permitted, and if the expected time period up to the collision is longer than the minimum value the limiting value function increases in proportion with the speed parameter.

13. The device of claim 12, wherein the minimum warning time is a time that a driver requires to react to a warning, and the correction value is set so that the uncritical warnings which are generated by the warning module are suppressed just before a stationary state of the obstacle.

14. The device of claim 13, wherein the second value is low enough to suppress the uncritical warnings and high enough to output critical warnings generated by the warning module to the driver, if the speed of the obstacle is above a threshold value.

15. A non-transitory computer readable medium having a computer program, which is executable by a processor, comprising:

a program code arrangement having program code for controlling a warning module based on an expected time period up to a collision of a vehicle with an obstacle, by performing the following:

permitting an outputting of a generated warning to a driver of the vehicle if the expected time period up to the collision is shorter than a limiting value function, which depends on a speed of the obstacle and/or a relative speed of the vehicle with respect to the obstacle, and otherwise suppressing a warning to the driver;

wherein the warning module is configured to generate the warning of an imminent triggering of an automatic emergency braking process of the vehicle to avoid the collision, wherein the limiting value function is a function of a speed parameter, wherein the limiting value function is representable as a partially non-homogenous linear function in the speed parameter, wherein a minimum value is given by a first value and a second value, wherein the first value defines a minimum warning time, and the second value defines a correction value, and wherein the second value is determined by optimization, with the result that the second value is low enough to suppress uncritical warnings and high enough to output critical warnings generated by the warning module to the driver, and wherein if the expected time period up to the collision is shorter than the minimum value the warning is permitted, and wherein if the expected time period is not shorter than the minimum value, the limiting value function increases with the speed parameter.

16. The non-transitory computer readable medium of claim 15, wherein the speed parameter defines a ratio of the speed of the obstacle to the relative speed with respect to the obstacle.

17. The non-transitory computer readable medium of claim 16, wherein if the expected time period up to the collision is shorter than the minimum value a warning is always permitted, and if the expected time period up to the collision is longer than the minimum value the limiting value function increases in proportion with the speed parameter.

18. The non-transitory computer readable medium of claim 17, wherein the minimum warning time is a time that a driver requires to react to a warning, and the correction value is set so that the uncritical warnings which are generated by the warning module are suppressed just before a stationary state of the obstacle.

19. The non-transitory computer readable medium of claim 18, wherein the second value is low enough to suppress the uncritical warnings and high enough to output critical warnings generated by the warning module to the driver, if the speed of the obstacle is above a threshold value.

* * * * *